Figure 1:
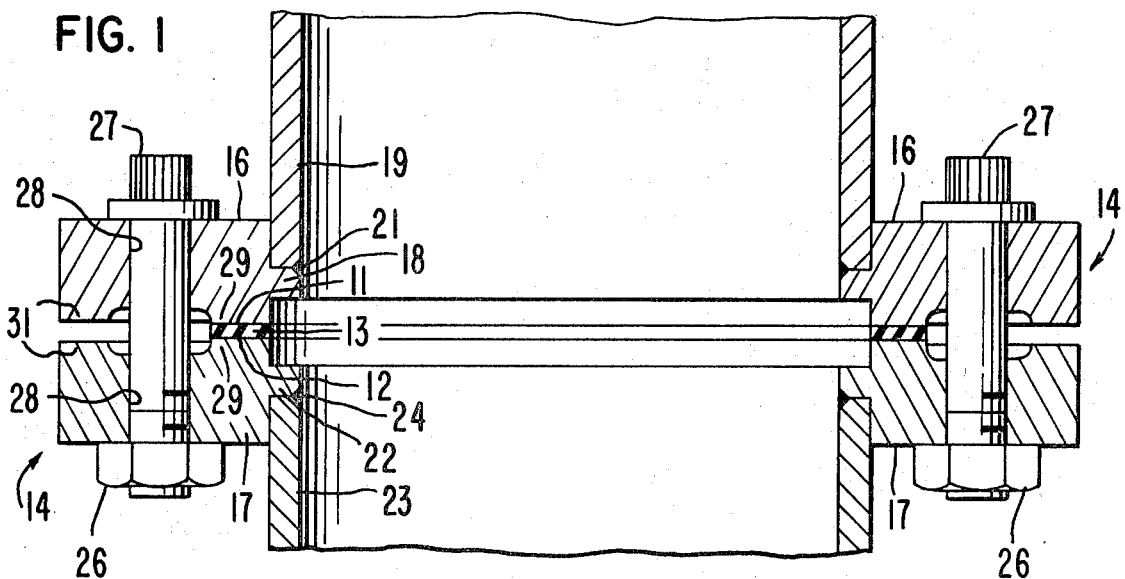

United States Patent

[11] 3,542,381

[72] Inventor Paul W. Hait
Los Altos, California
[21] Appl. No. 589,101
[22] Filed Oct. 24, 1966
[45] Patented Nov. 24, 1970
[73] Assignee Varian Associates
Palo Alto, California
a corporation of California

[54] SEALED JOINT FORMED WITH AROMATIC POLYIMIDE
4 Claims, 10 Drawing Figs.

[52] U.S. Cl. ............................................. 277/207,
277/237, 285/336, 285/349
[51] Int. Cl. .............................................. F16j 15/10
[50] Field of Search ............................................ 277/207,
MD, 208, 237, ATD; 285/OR, 336, 349, ATD

[56] References Cited
UNITED STATES PATENTS

| | | | |
|---|---|---|---|
| 2,942,901 | 6/1960 | Booth | 287/90(A)UX |
| 3,208,758 | 9/1965 | Carlson et al. | 277/187X |
| 508,765 | 11/1893 | Rouse | 285/349X |
| 1,940,729 | 12/1933 | Pfefferle | 285/349X |
| 2,417,025 | 3/1947 | Volpin | 285/336X |
| 2,783,295 | 2/1957 | Ewing | 285/349X |
| 2,831,708 | 4/1958 | Kircher | 285/336X |
| 3,058,761 | 10/1962 | Christophersen | 285/349X |
| 1,793,659 | 2/1931 | Wilson | 251/86 |

OTHER REFERENCES

Materials in Design Engineering Volume 57, January 1963 pages 145 and 147 TA 401 M5

*Primary Examiner*—Laverne D. Geiger
*Assistant Examiner*—Jeffrey S. Mednick
*Attorney*—Leon F. Herbert ABSTRACT: A high vacuum field joint assembly is described which is inexpensive and simply constructed but yet provides a dependable and bakable high vacuum seal. The assembly includes vacuum component flanges having opposed sealing surfaces confronting one another and one of which is provided with a gasket keeper recess. An aromatic polyimide gasket having a generally diamond shape in cross section with flattened peaks is disposed within the recess with opposed flattened peaks thereof in engagement with respective ones of said sealing surfaces. The other opposed flattened peaks of the gasket abut opposed sidewalls of the recess, and the thickness of the gasket between the first opposed flattened peaks is greater than the distance between the sealing surfaces on the vacuum components.

Patented Nov. 24, 1970

3,542,381

INVENTOR.
PAUL W. HAIT
BY
Leon F. Herbert
ATTORNEY

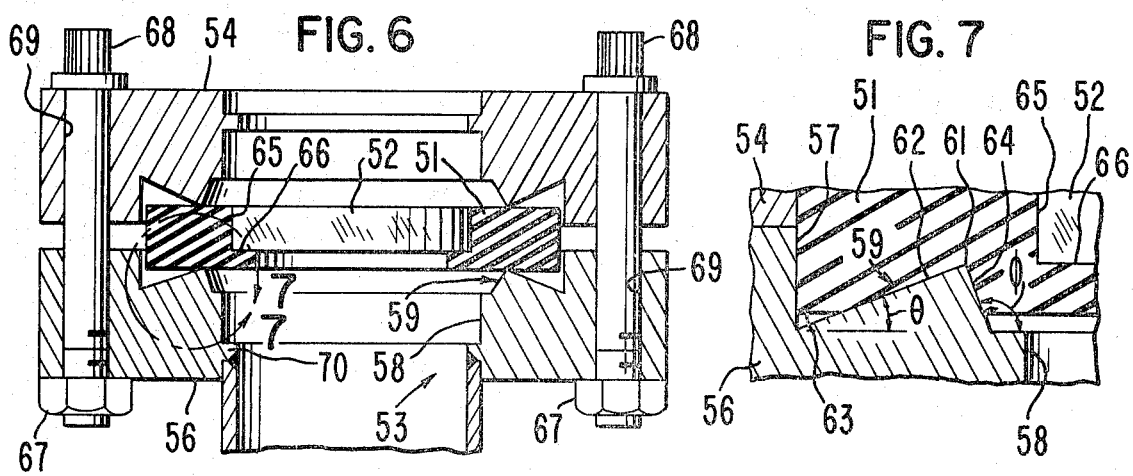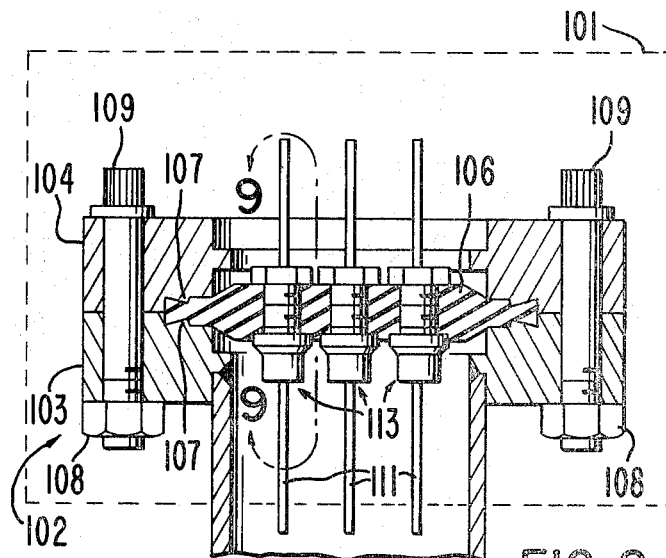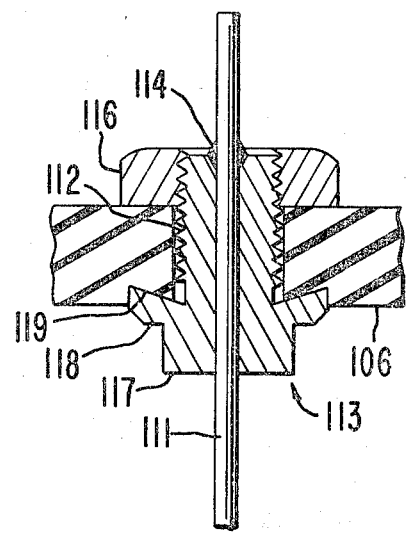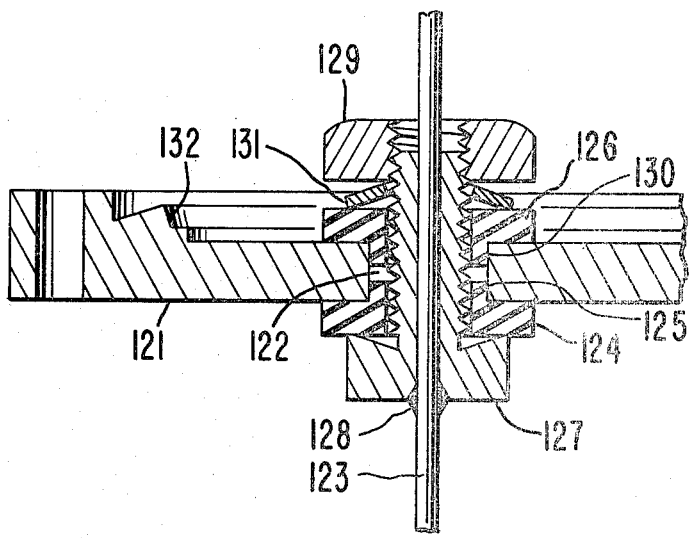

3,542,381

SEALED JOINT FORMED WITH AROMATIC POLYIMIDE

The present invention relates to sealed joints and, more particularly, to a sealed joint formed with aromatic polyimide material.

In vacuum and high pressure systems, sealed joints are employed for a variety of purposes. The more common uses of such joints are connecting conduits, forming sealed closures and forming gastight feedthroughs between components located in environments of different pressures. In order to achieve an ultra-high vacuum, i.e., pressures less than $10^{-9}$ Torr, it is essential that vacuum systems be baked out at temperatures as high as 300° C. However, at the present time, the only reliable bakeable vacuum seals available that can withstand such temperatures are metal vacuum seals. One such seal is described in U.S. Pat. No. 3,208,758 to M. A. Carlson et al. Such sealed joints are formed by providing a flange member with a ridge which penetrates or deforms a soft metal gasket, such as of copper. The ridged flange of such vacuum seals requires careful machining to insure that such seals will function dependably under ultra-high vacuum conditions. Furthermore, in order to form reliably a bakeable vacuum-tight seal with the metal vacuum seals, torque wrenches often must be used to create the necessary closing force to advance the ridged flange member to penetrate the soft metal gasket and form a gas tight seal.

Nonmetal seals, for example, those utilizing Viton-A, rubber gaskets, greases or plastics etc., often are employed in vacuum and pressurized systems. Unfortunately, however, such seals are not capable of forming ultra-high vacuum seals, especially at high temperatures at which most of these materials evolve large amounts of gas. This liberated gas often contaminates the system as well as altering the system pressure. Consequently, such non-metal vacuum seals are impractical for use in vacuum systems or pressurized systems which are to be operated at high temperatures, such as 300° C. or higher, especially where contamination is to be avoided.

The present invention provides a sealed joint which is simple to construct, useful for a variety of purposes and which is capable of functioning dependably at temperatures at least as high as 300° C. More specifically, the sealed joint of the present invention is formed by sandwiching aromatic polyimide material between confronting surfaces of a structure which defines the joint to be sealed. The polyimide material together with the confronting surfaces defining the joint form a gas tight seal when forced together. In practice, the seal can be formed by depositing a coating of aromatic polyimide material onto at least one of the confronting surfaces and forcing the two surfaces together. Alternatively, the seal can be formed by sandwiching a gasket of aromatic polyimide material in solid form between the confronting surfaces defining the joint. In all cases, the sealed joint of the present invention can be formed between flat confronting surfaces. Such sealed joints have functioned properly at pressures less than $10^{-10}$ Torr at temperatures as great as 300° C. This is to be distinguished from prior art ultra-high vacuum seals and high pressure seals which heretofore have required intricate joint geometries to accomplish dependable seals at ultra-high vacuums and high pressures.

Accordingly, it is an object of this invention to provide an inexpensive sealed joint which is simple to construct and which, in general, can be used wherever sealed joints are required.

More particularly, it is an object of this invention to provide an inexpensive and simply constructed sealed joint which can form a dependable seal between environments having a large difference in their pressures.

Another object of this invention is to provide a sealed joint which can form a dependable seal at elevated temperatures as high as 300° C.

Still another object of this invention is to provide a sealed joint suitable for use in ultra-high vacuum systems which experience high temperature operating conditions.

Yet another object of this invention is to provide a sealed joint which can be resealed.

A further object of this invention is to provide a sealed joint which can form a dependable vacuum seal without requiring the application of large closing forces.

It is yet a further object of this invention to provide a sealed joint which can for suited for use in vacuum systems which utilizes a gasket of a material that can be coated onto one of the confronting surfaces forming the joint.

Figure 2:
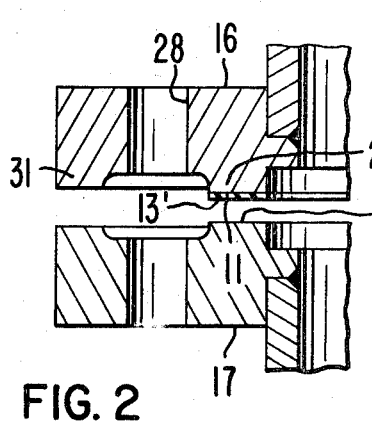
Figure 3:
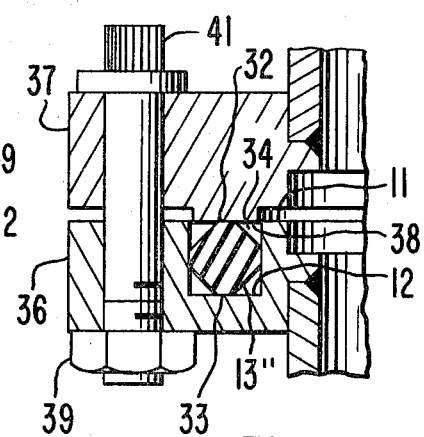
Figure 5:
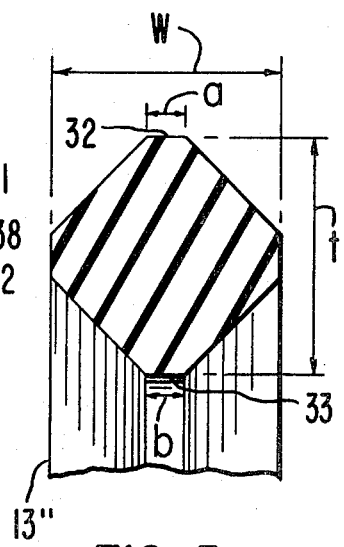
Figure 4:
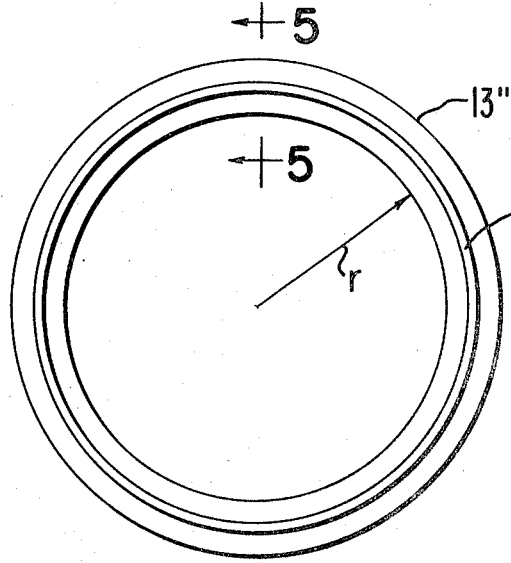

It is still a further object of this invention to provide a sealed joint suited for use in vacuum systems which requires a minimum of precision machining to construct the parts forming the joint.

and other objects and advantages will become more apparent from the following detailed description and claims considered together with the accompanying drawings of which:

FIG. 1 is a sectional view of a flange-type sealed joint having a gasket formed of polyimide material, FIG. 2 is a sectional view of a flange-type sealed joint having a gasket formed of polyimide material coated on one of the confronting surfaces of the joint, FIG. 3 is a sectional view of another flange-type sealed joint having a gasket of polyimide material in solid form, FIG. 4 is a plan view of the gasket employed in the sealed joint of FIG. 3, FIG. 5 is a sectional view of FIG. 4 taken along lines 5–5, FIG. 6 is a sectional view of a viewing port, FIG. 7 is an enlarged partial sectional view of the portion of FIG. 6 delineated by lines 7–7, FIG. 8 is a sectional view of a feedthrough, FIG. 9 is an enlarged partial sectional view of the portion of FIG. 8 delineated by lines 9–9, and FIG. 10 is a partial sectional view illustrating an alternate construction of a feedthrough.

With reference to the FIGS. 1–5, the sealed joint of the present invention includes at least two bodies, each one of which defines one of the confronting sealing surfaces 11 and 12 forming the joint to be sealed. Sandwiched between the confronting surfaces 11 and 12 is a gasket body of aromatic polyimide material 13. When the bodies defining sealing surfaces 11 and 12 and the polyimide gasket 13 are pressed firmly together, a sealed joint is obtained. To obtain a sealed joint with little or no leakage, a closing force creating a pressure of 5,000 p.s.i. along the surface of the polyimide gasket 13 is used to close the joint. The sealed joint of the present invention can be employed in both high pressure systems, i.e., systems whose ambient pressure is substantially above atmospheric pressure, and vacuum systems. However, since the sealed joint is uniquely suited for ultra-high vacuum applications, the sealed joint will be described in detail with reference to its use in vacuum systems.

With particular reference to FIG. 1, a vacuum flange 14 is illustrated that commonly is employed to join components of a vacuum system in gastight relation. More specifically, vacuum flange 14 includes a first flange member 16 and a second flange member 17, both of stainless steel. In standard practice, the flange members 16 and 17 are annular with each flange member secured to one of the vacuum apparatus to be joined. For example, as illustrated, flange member 16 is provided with a shoulder 18 about its inner periphery to which a conduit 19, such as an outlet of a vacuum chamber, is secured as by weld 21. Similarly, flange member 17 is provided with a shoulder 22 about its inner periphery to which a conduit 23, such as an inlet to a vacuum pump, is secured as by weld 24.

The flange members 16 and 17 are mounted for relative movement toward each other so that their respective sealing surfaces 11 and 12 are in a confronting relationship when the flange members are brought together. To facilitate manufacturing of the flange, the confronting surfaces 11 and 12 are made flat. A sealed joint is formed by sandwiching the aromatic polyimide body 13 between the flat confronting surfaces 11 and 12.

As illustrated in FIG. 1, the flange members 16 and 17 are mounted along a common axis and are secured together by flange nuts 26 and flange bolts 27 inserted through the flange bolt apertures 28 passing through the flange members. To facilitate creating the desired sealing pressure, a number of flange nuts and bolts are used about the annular flange.

In one type of vacuum flange 14 constructed in accordance with the present invention, the annular flange members 16 and 17 had a C-shaped cross section whose arms 29 and 31 defined plateaus. The flange bolt apertures 28 are located centrally through the flange members 16 and 17 between the arms 29 and 31. A ring of polyimide 0.025 inch thick forming gasket 13 was inserted between the plateaus defined by the inwardly spaced arms 29 of the flange members 16 and 17. A gastight sealed joint was formed by tightening the flange nuts 26 onto the flange bolts 27 by a common hand wrench to create a pressure of 5,000 p.s.i. on the gasket 13. To minimize the closing force necessary to create the desired sealing pressure the length of the arms 29 between which gasket 13 is sandwiched is greater, for example, by 0.030 inches than the length of the arms 31.

In those cases where the gasket body 13 was placed between the flange members 16 and 17 in its solid form, polyimide was used that was manufactured by E. I. du Pont de Nemours and Co. Inc. and designated as SP-1 Vespel. When polyimide in its solid form is placed between the flange members 16 and 17 to form an ultra-high vacuum seal, the confronting sealing surfaces 11 and 12 should be machined to have a finish of 32 r.m.s. or better with a circular lay. With such a finish, ultra-high vacuum seals can be formed which will remain effective even at high temperatures.

In FIG. 2, a flange type sealed joint like that of FIG. 1 is illustrated which utilizes a coating 13' of polyimide material to form the gasket body of the sealed joint. The coated gasket 13' is formed by coating at least one of the confronting sealing surfaces, surface 11 shown in FIG. 2, with an aromatic polyimide material until the gasket 13' is at least 0.003 inch thick. Generally, two or three coating steps are necessary to form a 0.003 inch thick gasket. The method by which the coated polyimide gasket 13' can be formed on the sealing surface 11 is as follows: The monomers pyromellitic dianhydride and an aromatic diamine such as dimethyl formamide, dimethyl acetamine, and N-methyl-2-pyrrolidone, marketed under the trade name PYRE-ML 5057 by E. I. du Pont de Nemours and Co. Inc. is mixed thoroughly to form a soluble polyamic acid solution. The mixture is coated evenly on the sealing surface 11 of stainless steel flange member 16. The coating may be applied either by brush or spray gun. Prior to applying the coating to the sealing surface 11, the surface is thoroughly cleaned and rinsed with acetone. Immediately after depositing a coat of the mixture, the coat is force dried as by passing over the surface with a heater gun at a distance of about 8 to 10 inches from the sealing surface 11, or by placing the coated object into an oven and raising the temperature of the coating to about 250° C until the coating has a dull dry appearance. Additional coats may be applied over the first coat and force-dried in the same manner until a coating of the desired thickness is obtained. Prior to use, the coating is cured by heating the coated object to a temperature of about 300° C. and maintaining it at that temperature for about 6 hours. The coating can be cured by placing the coated body into a vacuum furnace which is continuously evacuated to remove the remainder of the volatilized solvent. When the sealed joint is employed in vacuum systems which are baked out, the coating can be cured during the bake out procedure with the sealed joint assembled for use.

It should be noted that by forming the gasket 13' by coating and bonding aromatic polyimide to the sealing surface, any irregularities on the surface 11 will be filled by the mixture. Hence, the surface finish required on the confronting sealing surface onto which the polyimide gasket 13' is formed is relaxed, even for ultra-high vacuum applications.

A most important and distinguishing feature of the sealed joint embodiment of FIG. 2 is that it is easily repairable if damaged. For example, if either the sealing surface 12 or the confronting surface of the coated gasket 13' are damaged as by scratches, the seal joint can be restored to its original condition by coating the damaged surface with polyimide by the method described above.

Referring now to FIGS. 3—5, a sealed joint constructed in accordance with the present invention and a solid polyimide gasket body 13'' of unique construction employed therein is illustrated. The polyimide gasket 13'' has a multisided cross section having at least two opposite flat sides 32 and 33. In use the polyimide gasket 13'' is positioned in the joint with its opposite flat sides 32 and 33 opposite confronting sealing surfaces 11 and 12 of the joint. In the vacuum flange of FIG. 3, the multisided polyimide gasket 13'' is inserted in a gasket keeper recess 34 defined in the flange member 36. The bottom side of the recess 34 defines the confronting sealing surface 12. The opposite flange member 37 defines a shoulder 38 on the side thereof facing the recess 34 of a width slightly smaller than that of the recess 34 and in registry therewith. The plateau of shoulder 38 defines the confronting sealing surface 11. As shown in FIG. 3, gasket body 13'' also has opposed sides abutting opposite sides of recess 34. As the flange nuts 39 and bolts 41 passing through the flange members 36 and 37 are tightened, the shoulder 38 and bottom side of recess 34 engage the opposite sides 32 and 33 respectively of gasket 13'' to form the gas tight sealed joint. A closing force of 5,000 p.s.i. will create ultra-high vacuum seals.

Alternative constructions of the particular manner of holding multisided gasket 13'' in place for forming the sealed joint are possible. For example, both flange members 36 and 37 could be provided with recesses, with the total of the depth of both recesses being smaller than the thickness $t$ of the gasket 13''. Also, the shoulder 38 could be eliminated from flange member 37 if the thickness $t$ of gasket 13'' is made larger than the depth of the recess 34.

With particular reference to FIGS. 4 and 5, the sides 32 and 33 which are to form the seal should have widths $a$ and $b$ respectively of 0.025 inch or larger. In practice, it was found that multisided seals often structurally failed when the widths $a$ and $b$ were made smaller than 0.025 inch. Also, it has been found that the closing force required to effect a gas tight seal between gasket 13'' and the confronting sealing surfaces 11 and 12 is minimized if the widths of the sides 32 or 33 were set at 0.025 inch.

In many applications, the polyimide gasket will be employed to form a sealed joint with confronting sealing surfaces formed of stainless steel members. To allow for differential thermal expansion between the stainless steel and polyimide members, provision should be made for the relative expansion of the polyimide gasket and stainless steel members, especially where high temperatures are involved. If the gasket is confined so that it is unable to expand into some empty space, the added compression of the gasket due to expansion at high temperature will cause the gasket to exceed its elastic limit and take a permanent plastic set which will result in a defective seal upon cooling.

To allow for the greatest degree of differential thermal expansion while maintaining structural integrity, the multisided gasket 13'' of FIG. 3 is constructed to be generally diamond shape, with peaks flattened, at least at sides 32 and 33, to have a width of at least 0.025 inch. In one embodiment of the diamond-shaped gasket 13'' constructed and employed in a sealed joint, the gasket 13'' was annular in shape having a minor diameter of 1.25 inches. The overall width $w$ was 0.14 inch and the thickness $t$ was 0.14 inch. The width $a$ was set at 0.025 inch and the width $b$ at 0.025 inch. The peaks facing in the direction of width $w$ also were flattened to 0.025 inch.

The sealed joint of the present invention can be used to form vacuum seals in various devices such as valves, feedthroughs, viewing ports and other vacuum coupling means.

Often it is necessary to couple a device in gastight relation between environments at different pressures, for example, between an evacuated chamber and atmospheric surroundings. In vacuum systems, view ports often are inserted within the wall of a vacuum chamber to permit observation of its interior. Also, various feedthroughs are inserted through the walls of vacuum chambers. In such cases, it is the practice to fix the surrounded structures, such as a view port, by brazing the view port to a gasket material which in turn is secured to the surrounding vacuum chamber wall by common sealed flange techniques. By utilizing a polyimide gasket wedged between a flange and the structure to which the view port or other device is to be coupled, brazing can be eliminated, thereby greatly facilitating joining such structures.

Referring to FIGS. 6—7, a polyimide gasket 51 is employed to capture a view port 52 in gas tight relation for mounting the view port assembly 53, for example, to a vacuum chamber (not shown). More particularly, the view port assembly 53 includes first and second identical stainless steel flange members 54 and 56. Each flange member 54 and 56 is annular shaped and mounted for movement along a common axis toward each other. Each flange member has a shoulder defined by inner walls 57 and 58 parallel to the common axis and a confronting surface 59 therebetween facing the opposite flange member.

The confronting surface 59 has a ridge portion 61 projecting towards the opposite flange member, the ridge portions of the flange members being directly opposite each other. The primary sealing surface 62 which slopes toward the inner wall 57 at an acute angle $\theta$. In the preferred embodiment, $\theta$ is 20°. The inner wall 57 and sloping sealing surface 62 form a groove 63 for trapping the polyimide gasket 51. Each ridge portion 61 further includes an auxiliary sealing surface 64 which slopes toward the confronting surface 59 at an obtuse angle $\Phi$. In the preferred embodiment, $\Phi$ is 110°. As will be described in more detail hereinbelow, the sloping auxiliary sealing surface 64 aids in forming the gas tight seal between the polyimide gasket 51 and the body which it surrounds.

In constructing a view port assembly 53 for mounting to a vacuum chamber, view port 52, such as a sapphire window, is snugly inserted within an aperture 65 defined by the annular gasket 51. To facilitate assembling of the view port assembly 53, a shoulder 66 is provided along the surface defining the aperture 65 for supporting the sapphire view port 52. A vacuum seal about the view port 52 is formed by inserting the gasket 51 of the port assembly 53 between the flange members 54 and 56. The flange nuts 67 are tightened on flange bolts 68 which are inserted through apertures 69 passing through the flange members. This results in movement of the flange members toward each other and causes a penetration of the gasket 51 by the ridge portions 61. By providing the auxiliary sealing surface 64, the penetration of the gasket 51 by the ridge portions 61 causes the polyimide to be extended in on the sapphire port 52 and against the inner walls 57 of the flange members 54 and 56. The gap 63 captures and secures the polyimide gasket 51 between the flange members to form a gas tight sealed joint with the sealing surfaces 62 and 64 of the ridge portions 61. The extension of the polyimide gasket 51 against the sapphire port 52 forms a gas tight sealed joint around the port 52. Since opposite sides of the polyimide gasket 51 bear against the inner wall 57 of the flange members 54 and 56 and the sapphire window 52, the gasket 51 is prevented from pulling away from the sapphire window 52 even when the view port assembly 53 is cycled through a temperature range of 30° to 300° C.

The view port assembly 53 is mounted in a wall of a vacuum chamber by welding a conduit extension of the vacuum chamber to mounting shoulder 70 projecting from inner wall 58 of the stainless steel flange member 56. Of course, the flange member 56 could form an integral port of the chamber wall.

The sealing technique described immediately hereinabove can be employed to couple other devices besides view ports between environments of different pressures. For example, a feedthrough can be inserted in place of the view port 52. Because of the insulating properties of polyimide material, the sealed joint of the present invention is particularly suited for use in coupling electrical feedthroughs between environments of different pressures.

With reference to FIGS. 8—9, a demountable multipin electrical feedthrough 101 is illustrated. The feedthrough 101 includes a stainless steel annular flange 102 having flange members 103 and 104 constructed in accordance with the teachings of the above identified U.S. Pat. No. 3,208,758 which is incorporated herein by reference. A polyimide gasket 106 is captured and secured in gastight relation between the flange members by opposite ridge portions 107 provided on confronting surfaces of the flange members. The gastight seal is formed by the ridge portions 107 penetrating the polyimide gasket 106 when the flange nuts 108 are tightened on the flange bolts 109 inserted through the flange members.

A plurality of electrical feedthroughs 111 are inserted through the polyimide gasket 106 through spaced pin apertures 112 provided in the polyimide gasket 106. In order that the electrical feedthroughs 111 can be conveniently replaced, the feedthroughs are demountably secured in gas tight relation to the gasket 106 within their respective apertures 112. The manner in which the electrical feedthroughs are demountably secured to the polyimide gasket 106 is shown in detail in FIG. 9. As shown therein, each electrical feedthrough pin 111 is inserted through a stainless steel bolt 113 and is secured therein by a gas tight silver-cooper braze 114. The bolt 113 is inserted through pin aperture 112 and is secured therein by nut 116. The head 117 of bolt 113 is provided with a flange 118 which bears on the polyimide gasket portion about the periphery of pin aperture 112. To accomplish a gastight seal about the feedthrough 111, flange 118 is provided with a sealing surface 119 which faces the polyimide gasket 106 and which is inclined relative to the polyimide gasket 106 at an acute angle, preferably of 20°. As nut 116 is tightened onto bolt 113, the flange 118 is embedded into the polyimide gasket portion about the periphery of the pin aperture 112 to form a gas tight seal along the sealing surface 119.

An alternate feedthrough assembly construction is illustrated in FIG. 10. In that embodiment, a stainless steel flange body 121 is provided with an aperture 122 through which a feedthrough such as an electrical pin 123 is inserted. The electrical pin 123 is mounted insulatingly spaced from the stainless steel flange body 121 by polyimide washers 124 and 126 disposed on each side of the flange body and are positioned within aperture 122 by a collar 125 and 130 integral with the polyimide washers 124 and 126 respectively. The washers are apertured to receive therethrough screw 127. The screw 127 is centrally apertured to receive the electrical pin 123. Pin 123 is secured within apertured screw 127 by a gastight braze 128.

As gastight seal is formed between polyimide washers 124 and 126 and stainless steel flange body 121 by tightening a nut 129 onto screw 127. In some applications, the feedthrough assembly will be used in high temperature environments. To allow differential thermal expansion of the polyimide washer and the surrounding stainless steel structure when the feedthrough is exposed to high temperatures, a spring washer 131 is inserted between the washer 126 and 129. In mounting the feedthrough assembly to, for example, a vacuum chamber, the flange body 121 is secured to a mating flange (not shown) so that polyimide washer 126 is within the vacuum chamber. A vacuum seal is formed between flange body 121 and the mating flange by penetrating a polyimide gasket (not shown) with ridge 132 on flange body 121 in the manner described hereinbefore with reference to FIGS. 6 and 7.

With respect to the seal joints formed in accordance with those illustrated in FIGS. 6—10, if the devices are used under ultra-high vacuum conditions, the stainless steel sealing surfaces should be machined to have a 32 r.m.s. finished with a circular lay.

With respect to the gasket in all FIGS., the sealing surfaces of the gasket should, for ultra-high vacuum use, be given a finish at least as good as 32 r.m.s. with a circular lay. Also, it should be understood that if the sealing surfaces of the gasket or metal member in any of the FIGS. become scratched or otherwise damaged, they can be repaired by filling the voids with aromatic polyimide material by the coating process described in connection with FIG. 2.

I claim:

1. A high vacuum joint sealing assembly comprising first and second vacuum component bodies having respectively first and second opposed sealing surfaces confronting one another and having defined therebetween a gasket keeper recess, a generally diamond shaped gasket of aromatic polyimide disposed within said recess and having first opposite flattened peaks confronting and mating with said opposed sealing surfaces and second opposite flattened peaks abutting opposed side walls of said recess, the remaining sides of said gasket being spaced from the walls of said recess to provide expansion room within said recess for said gasket, and the thickness of said gasket between said first opposite flattened peaks being greater than the distance between said sealing surfaces whereby said gasket is in compression between said sealing surfaces and a high vacuum seal is provided between each of said sealing surfaces and the flattened peak of the gasket in engagement therewith.

2. The sealed joint according to claim 1 wherein said first opposed flattened peaks have a width of at least 0.025 inch.

3. The sealed joint according to claim 1 wherein said first and second sealing surfaces formed on first and second vacuum component bodies are annular flange members mounted for relative movement towards each other, one of said flange members having said gasket keeper recess for securing said gasket to engage the sealing surfaces defined by said flange members.

4. The sealed joints according to claim 3 wherein said gasket is said first opposed flattened peaks have a width of at least 0.025 inch, said sealing surfaces defined by said annular flange members having a finish of 32 r.m.s. with a circular lay.